US011870698B2

(12) United States Patent
Ji et al.

(10) Patent No.: US 11,870,698 B2
(45) Date of Patent: Jan. 9, 2024

(54) CONGESTION CONTROL METHOD AND APPARATUS, COMMUNICATIONS NETWORK, AND COMPUTER STORAGE MEDIUM

(71) Applicant: HUAWEI TECHNOLOGIES CO., LTD., Shenzhen (CN)

(72) Inventors: Zhigang Ji, Beijing (CN); Di Qu, Beijing (CN); Yinben Xia, Shenzhen (CN); Siyu Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 17/540,575

(22) Filed: Dec. 2, 2021

(65) Prior Publication Data
US 2022/0094640 A1  Mar. 24, 2022

Related U.S. Application Data

(63) Continuation of application No. PCT/CN2020/092660, filed on May 27, 2020.

(30) Foreign Application Priority Data

Jun. 17, 2019 (CN) .......................... 201910523078.4

(51) Int. Cl.
*H04L 47/00* (2022.01)
*H04L 47/122* (2022.01)
(Continued)

(52) U.S. Cl.
CPC ............ *H04L 47/122* (2013.01); *H04L 47/11* (2013.01); *H04L 47/25* (2013.01); *H04L 47/283* (2013.01); *H04L 49/506* (2013.01)

(58) Field of Classification Search
None
See application file for complete search history.

(56) References Cited

U.S. PATENT DOCUMENTS

2004/0111541 A1* 6/2004 Meyer ..................... H04L 47/10
710/52
2014/0153387 A1   6/2014 Wu et al.
(Continued)

FOREIGN PATENT DOCUMENTS

CN           1545286 A    11/2004
CN         101964755 A     2/2011
(Continued)

OTHER PUBLICATIONS

Yifei Lu et al.,"Dynamic ECN marking threshold algorithm for TCP congestion control in data center networks", Computer Communications, 2018, total 10 pages.
(Continued)

Primary Examiner — Abdelillah Elmejjarmi
(74) Attorney, Agent, or Firm — Rimon PC

(57) ABSTRACT

This application discloses a congestion control method and related apparatus. In the congestion control method, a network device first obtains statistical information of a target egress queue within a first time period, where the target egress queue is any target egress queue in the network device. The network device determines an explicit congestion notification (ECN) threshold for the target egress queue within a second time period based on the statistical information of the target egress queue within the first time period, where the second time period is chronologically subsequent to the first time period. When a queue depth of the target egress queue exceeds the ECN threshold within the second time period, the network device sets an ECN mark for a data packet in the target egress queue.

17 Claims, 3 Drawing Sheets

(51) Int. Cl.
    *H04L 47/11*     (2022.01)
    *H04L 47/25*     (2022.01)
    *H04L 47/283*     (2022.01)
    *H04L 49/506*     (2022.01)

(56) References Cited

U.S. PATENT DOCUMENTS

2016/0294696 A1    10/2016    Gafni et al.
2017/0339062 A1    11/2017    Mayer-Wolf et al.
2019/0104057 A1*    4/2019    Goel ................. H04L 47/26

FOREIGN PATENT DOCUMENTS

| CN | 101977151 A | 2/2011 |
|----|-------------|--------|
| CN | 106789701 A | 5/2017 |
| CN | 108306827 A | 7/2018 |
| CN | 108989235 A | 12/2018 |
| CN | 109245959 A | 1/2019 |
| EP | 1249972 A1 | 10/2002 |
| JP | H1056457 A | 2/1998 |
| JP | 2004304806 A | 10/2004 |
| JP | 2004532566 A | 10/2004 |
| WO | 2013081518 A1 | 6/2013 |
| WO | 2015092260 A1 | 6/2015 |

OTHER PUBLICATIONS

Bob Briscoe et al.,"Reducing Internet Latency: a Survey of Techniques and Their Merits",IEEE Communication Surveys and Tutorials, vol. 18, No. 3, Third Quarter 20 16, total 48 pages.

* cited by examiner

CONGESTION CONTROL METHOD AND APPARATUS, COMMUNICATIONS NETWORK, AND COMPUTER STORAGE MEDIUM

CROSS-REFERENCE TO RELATED APPLICATIONS

This application is a continuation of International Application No. PCT/CN2020/092660, filed on May 27, 2020, which claims priority to Chinese Patent Application No. 201910523078.4, filed on Jun. 17, 2019. The disclosures of the aforementioned applications are hereby incorporated by reference in their entireties.

TECHNICAL FIELD

This application relates to the field of network technologies, and in particular, to a congestion control method and apparatus, a communications network, and a computer storage medium.

BACKGROUND

Congestion control is an important method for improving network resource utilization and optimizing network transmission quality.

In a current network, congestion control is usually performed based on an explicit congestion notification (ECN) mechanism.

Currently, a transmit end and a receive end communicate with each other through data packet forwarding performed by a network device. A process in which the network performs congestion control based on the ECN mechanism includes: The transmit end sends a data packet that supports the ECN mechanism; the network device detects whether a queue depth of an egress queue exceeds a preset ECN threshold; when the queue depth of the egress queue exceeds the ECN threshold, the network device sets an ECN mark for a data packet in the egress queue; after receiving the data packet that includes the ECN mark, the receive end sends a congestion notification packet to the transmit end; and after receiving the congestion notification packet, the transmit end reduces a transmission rate of subsequent data packets, to avoid network congestion. The egress queue in the network device may also be referred to as a forwarding queue, and the egress queue is used to buffer a data packet sent by the transmit end to the receive end.

However, when an excessively high ECN threshold is set, the queue depth of the egress queue in the network device is comparatively large, resulting in a longer data packet transmission delay. When an excessively low ECN threshold is set, the transmit end sends a data packet at a lower rate, resulting in lower network resource utilization. Therefore, flexibility in network congestion control is comparatively low currently.

SUMMARY

This application provides a congestion control method and apparatus, a communications network, and a computer storage medium, to resolve a current problem of comparatively low flexibility in network congestion control.

According to a first aspect, a congestion control method is provided. A network device obtains statistical information of a target egress queue within a first time period, where the target egress queue is any egress queue in the network device. The network device determines, based on the statistical information of the target egress queue within the first time period, an ECN threshold for the target egress queue within a second time period. When a queue depth of the target egress queue exceeds the ECN threshold within the second time period, the network device sets an ECN mark for a data packet in the target egress queue.

The second time period is chronologically subsequent to the first time period. The first time period is a past time period, and the second time period may be a current time period. The network device determines an ECN threshold for an egress queue within a current time period based on statistical information of the egress queue within a past time period, thereby implementing dynamic adjustment of the ECN threshold for the egress queue. In this way, the network device can achieve both a low transmission delay and a high throughput in various communications networks or a communications network that changes in real time, thereby improving flexibility in network congestion control.

In a first implementation of the first aspect, the statistical information includes a packet transmission rate. In this case, a process in which the network device determines the ECN threshold for the target egress queue within the second time period based on the statistical information of the target egress queue within the first time period includes: The network device determines the ECN threshold based on the packet transmission rate and a target delay, where the target delay is positively correlated with a maximum round trip time on transmission links on which the network device is located. In one embodiment, the target delay is positively correlated with a maximum round trip time on all transmission links on which the network device is located.

Optionally, the target delay may be equal to the maximum round trip time on all the transmission links on which the network device is located. The ECN threshold for the target egress queue within the second time period is determined based on the packet transmission rate of the target egress queue within the first time period, so that the ECN threshold for the target egress queue is positively correlated with the packet transmission rate. This can ensure a high throughput for a communications network while ensuring a low transmission delay of a data packet, thereby improving network resource utilization.

With reference to the first implementation of the first aspect, in a second implementation of the first aspect, the statistical information further includes queue depth change information. In this case, a process in which the network device determines the ECN threshold based on the packet transmission rate and the target delay includes: When a queue depth of the target egress queue at an end moment of the first time period is greater than or equal to a queue depth of the target egress queue at a start moment of the first time period, the network device determines the ECN threshold based on the packet transmission rate of the target egress queue within the first time period and the target delay.

With reference to the first implementation of the first aspect, in a third implementation of the first aspect, the statistical information further includes PFC back pressure information. In this case, a process in which the network device determines the ECN threshold based on the packet transmission rate and the target delay includes: When the target egress queue does not receive a PFC frame within the first time period, and the packet transmission rate of the target egress queue within the first time period is not 0, the network device determines the ECN threshold based on the packet transmission rate of the target egress queue within the first time period and the target delay.

With reference to the first implementation of the first aspect, in a fourth implementation of the first aspect, the statistical information further includes queue depth change information and PFC back pressure information. In this case, a process in which the network device determines the ECN threshold based on the packet transmission rate and the target delay includes:

the network device determines a first ECN threshold based on the packet transmission rate of the target egress queue within the first time period and the target delay; the network device determines a second ECN threshold based on queue depth change information of the target egress queue within the first time period; the network device determines a third ECN threshold based on PFC back pressure information of the target egress queue within the first time period; and the network device determines a maximum ECN threshold of the first ECN threshold, the second ECN threshold, and the third ECN threshold as the ECN threshold for the target egress queue within the second time period, where the ECN threshold for the target egress queue within the second time period is determined based on the packet transmission rate of the target egress queue within the first time period and the target delay, or the ECN threshold for the target egress queue within the second time period is a maximum ECN threshold supported by a forwarding chip on which the target egress queue is located.

In a fifth implementation of the first aspect, the statistical information includes queue depth change information. In this case, a process in which the network device determines the ECN threshold for the target egress queue within the second time period based on the statistical information of the target egress queue within the first time period includes: When a queue depth of the target egress queue at an end moment of the first time period is less than a queue depth of the target egress queue at a start moment of the first time period, the network device determines a maximum ECN threshold supported by a forwarding chip on which the target egress queue is located as the ECN threshold for the target egress queue within the second time period, or cancels setting of the ECN threshold for the target egress queue within the second time period.

When the queue depth of the target egress queue at the end moment of the first time period is less than the queue depth of the target egress queue at the start moment of the first time period, it indicates that a packet transmission rate of the target egress queue within the first time period is greater than a packet reception rate of the target egress queue within the first time period. That is, it reflects that a packet transmission rate of a transmit end does not reach a maximum throughput of the network device. Therefore, a rate at which the transmit end sends a data packet does not need to be reduced. In this case, the maximum ECN threshold supported by the forwarding chip on which the target egress queue is located may be used as the ECN threshold for the target egress queue, or the setting of the ECN threshold for the target egress queue may be cancelled, to improve network resource utilization.

In a sixth implementation of the first aspect, the statistical information includes PFC back pressure information. In this case, a process in which the network device determines the ECN threshold for the target egress queue within the second time period based on the statistical information of the target egress queue within the first time period includes: When the target egress queue receives a PFC frame within the first time period, or a packet transmission rate of the target egress queue within the first time period is 0, the network device determines a maximum ECN threshold supported by a forwarding chip on which the target egress queue is located as the ECN threshold for the target egress queue within the second time period, or cancels setting of the ECN threshold for the target egress queue within the second time period.

When the target egress queue receives the PFC frame within the first time period, or the packet transmission rate of the target egress queue within the first time period is 0, if congestion occurs in the target egress queue in the network device, it may be determined that the congestion is caused by the PFC frame sent by a downstream device. Therefore, an ECN mark does not need to be set for a data packet in the target egress queue. The maximum ECN threshold supported by the forwarding chip that is in the network device and on which the target egress queue is located may be used as the ECN threshold for the target egress queue, or the setting of the ECN threshold for the target egress queue may be cancelled. In this way, the following problem is avoided: A receive end sends a congestion notification packet to a transmit end for a plurality of times, which causes the transmit end to excessively reduce a transmission rate of subsequent data packets, consequently affecting a throughput of a communications network.

According to a second aspect, a congestion control apparatus is provided, where the apparatus includes:
  an obtaining module, configured to obtain statistical information of a target egress queue within a first time period, where the target egress queue is any egress queue in a network device;
  a determining module, configured to determine an explicit congestion notification ECN threshold for the target egress queue within a second time period based on the statistical information of the target egress queue within the first time period; and
  a marking module, configured to: when a queue depth of the target egress queue exceeds the ECN threshold within the second time period, set an ECN mark for a data packet in the target egress queue.

Optionally, the statistical information includes a packet transmission rate, and the determining module is configured to:
  determine the ECN threshold based on the packet transmission rate and a target delay, where the target delay is positively correlated with a maximum round trip time on some or all transmission links on which the network device is located.

Optionally, the statistical information further includes queue depth change information, and the determining module is further configured to:
  when a queue depth of the target egress queue at an end moment of the first time period is greater than or equal to a queue depth of the target egress queue at a start moment of the first time period, determine the ECN threshold based on the packet transmission rate and the target delay.

Optionally, the statistical information further includes priority flow control PFC back pressure information, and the determining module is further configured to:
  when the target egress queue does not receive a PFC frame within the first time period, and a packet transmission rate of the target egress queue within the first time period is not 0, determine the ECN threshold based on the packet transmission rate and the target delay.

Optionally, the statistical information further includes queue depth change information and priority flow control PFC back pressure information, and the determining module is further configured to:

determine a first ECN threshold based on the packet transmission rate and the target delay;

determine a second ECN threshold based on the queue depth change information;

determine a third ECN threshold based on the PFC back pressure information; and determine a maximum ECN threshold of the first ECN threshold, the second ECN threshold, and the third ECN threshold as the ECN threshold, where the ECN threshold is determined based on the packet transmission rate and the target delay, or the ECN threshold is a maximum ECN threshold supported by a forwarding chip on which the target egress queue is located.

Optionally, the statistical information includes queue depth change information, and the determining module is configured to:

when a queue depth of the target egress queue at an end moment of the first time period is less than a queue depth of the target egress queue at a start moment of the first time period, determine a maximum ECN threshold supported by a forwarding chip on which the target egress queue is located as the ECN threshold for the target egress queue within the second time period, or cancel setting of the ECN threshold for the target egress queue within the second time period.

Optionally, the statistical information includes priority flow control PFC back pressure information, and the determining module is configured to:

when the target egress queue receives a PFC frame within the first time period, or a packet transmission rate of the target egress queue within the first time period is 0, determine a maximum ECN threshold supported by a forwarding chip on which the target egress queue is located as the ECN threshold for the target egress queue within the second time period, or cancel setting of the ECN threshold for the target egress queue within the second time period.

According to a third aspect, a communications network is provided, including a transmit end, a network device, and a receive end, where the network device includes the congestion control apparatus according to any implementation of the second aspect.

According to a fourth aspect, a network device is provided, where the network device includes a processor and a memory.

The memory is configured to store a computer program, where the computer program includes program instructions.

The processor is configured to invoke the computer program to implement the congestion control method according to any implementation of the first aspect.

According to a fifth aspect, a computer storage medium is provided, where the computer storage medium stores instructions. When the instructions are executed by a processor, the congestion control method according to any implementation of the first aspect is implemented.

According to a sixth aspect, a chip is provided, where the chip includes a programmable logic circuit and/or program instructions. When the chip is run, the congestion control method according to any implementation of the first aspect is implemented.

Beneficial effects brought by the technical solutions provided in this application include at least the following.

A network device determines an ECN threshold for an egress queue within a current time period based on statistical information of the egress queue within a past time period, thereby implementing dynamic adjustment of the ECN threshold for the egress queue. In this way, the network device can achieve both a low transmission delay and a high throughput in various communications networks or a communications network that changes in real time, thereby improving flexibility in network congestion control.

DETAILED DESCRIPTION

To make the objectives, technical solutions, and advantages of this application clearer, the following further describes the implementations of this application in detail with reference to the accompanying drawings.

Figure 1:
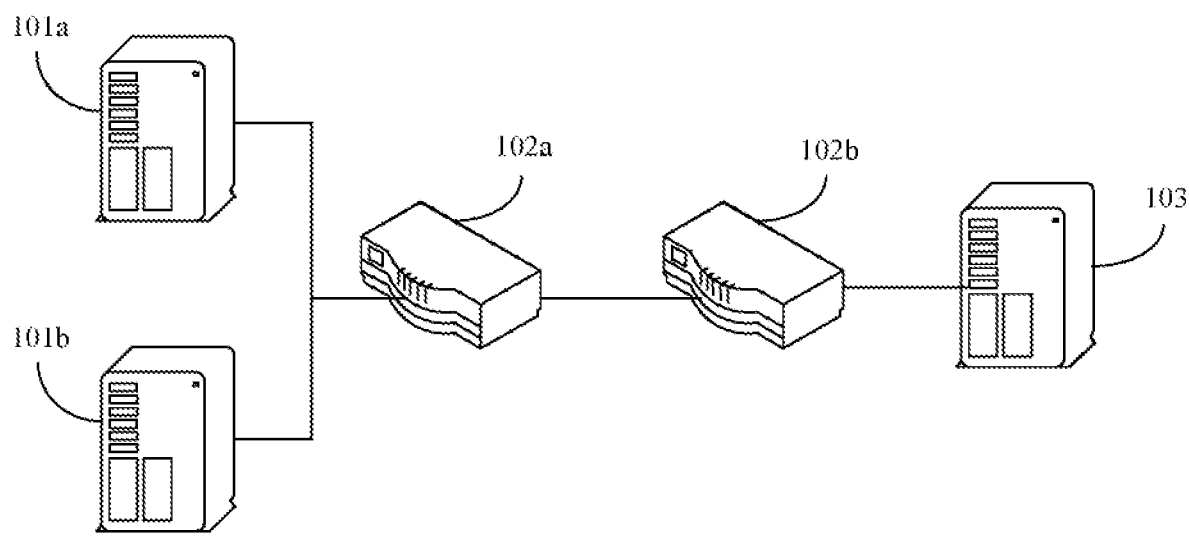
FIG. 1 is a schematic structural diagram of a communications network according to an embodiment of this application.

FIG. 1 is a schematic structural diagram of a communications network according to an embodiment of this application. As shown in FIG. 1, the communications network includes transmit ends 101a and 101b (collectively referred to as a transmit end 101), network devices 102a and 102b (collectively referred to as a network device 102), and a receive end 103. Quantities of transmit ends, network devices, and receive ends in FIG. 1 are merely used as an example, and are not intended to limit the communications network provided in the embodiments of this application.

Optionally, the communications network provided in an embodiment of this application may be a data center network (DCN), a metropolitan area network, a wide area network, a campus network, or the like. A type of the communications network is not limited in the embodiments of this application. The transmit end 101 may be a server, a server cluster including several servers, or a cloud computing service center. The receive end 103 may be a server, a server cluster including several servers, or a cloud computing service center. The network device 102 may be a switch, a router, or the like. Each network device 102 includes one or more egress queues, and the egress queue is used to buffer a data packet sent by the transmit end 101 to the receive end 103. The transmit end 101 and the receive end 103 communicate with each other through data packet forwarding performed by the network device 102.

The communications network provided in an embodiment of this application performs congestion control based on an ECN mechanism. Optionally, a process of communication between the transmit end and the receive end in the communications network includes the following steps a to e.

In step a, the transmit end sends a data packet to the network device.

A value of an ECN field in an Internet Protocol (IP) header of the data packet sent by the transmit end is set to 10 or 01, to indicate that the data packet sent by the transmit end supports the ECN mechanism.

In step b, the network device buffers the received data packet in a first egress queue.

The first egress queue is any egress queue in the network device.

In step c, the network device detects whether a queue depth of the first egress queue exceeds a corresponding ECN threshold.

A queue depth of an egress queue is used to indicate a total quantity of bytes of data packets buffered in the egress queue. A larger queue depth of the egress queue indicates that more memory of the egress queue is occupied. A transmission delay of a data packet is positively correlated with a queue depth of an egress queue. That is, a larger queue depth of the egress queue indicates a longer transmission delay of the data packet.

Figure 2:
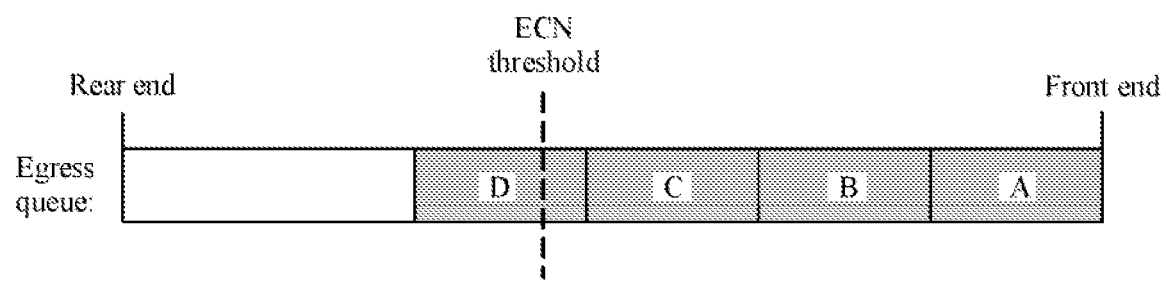
FIG. 2 is a schematic diagram of an egress queue for which an ECN threshold is configured according to an embodiment of this application.

Optionally, an ECN threshold is configured for each egress queue in the network device. The ECN threshold is a threshold for setting an ECN mark. When the queue depth of the egress queue does not exceed the ECN threshold, no ECN mark needs to be set for a data packet in the egress queue. When the queue depth of the egress queue exceeds the ECN threshold, the ECN mark needs to be set for a data packet in the egress queue. For example, FIG. 2 is a schematic diagram of an egress queue for which an ECN threshold is configured according to an embodiment of this application. As shown in FIG. 2, a plurality of data packets are buffered in the egress queue, including a data packet A, a data packet B, a data packet C, and a data packet D that are sequentially buffered in the egress queue, the data packet A is at a front end of the egress queue, and the data packet D is close to a rear end of the egress queue. Refer to FIG. 2, The data packet A, the data packet B, and the data packet C are before the ECN threshold, some bytes of the data packet D are before the ECN threshold, and the other bytes of the data packet D are after the ECN threshold. In this case, a queue depth of the egress queue exceeds the ECN threshold. That is, before the data packet D is buffered in the egress queue, the queue depth of the egress queue does not exceed the ECN threshold, and after the data packet D is buffered in the egress queue, the queue depth of the egress queue exceeds the ECN threshold.

In step d, when the queue depth of the first egress queue exceeds the ECN threshold, the network device sets an ECN mark for a data packet in the first egress queue.

Optionally, after receiving a data packet each time, the network device detects whether the queue depth of the first egress queue exceeds the corresponding ECN threshold. When the queue depth of the first egress queue exceeds the ECN threshold, the network device sets the ECN mark for a received data packet, and buffers the data packet which includes the ECN mark in the first egress queue. Alternatively, after receiving a data packet, the network device buffers the data packet in the first egress queue, and when the network device intends to send a data packet that is in the first egress queue, the network device detects whether the queue depth of the first egress queue exceeds the corresponding ECN threshold. When the queue depth of the first egress queue exceeds the ECN threshold, the network device sets the ECN mark for the to-be-sent data packet. That the network device sets the ECN mark for the to-be-sent data packet means that the network device sets a value of an ECN field in an IP header of the data packet to 11.

In step e, the network device sends a data packet in the first egress queue to the receive end.

Optionally, when receiving the data packet including the ECN mark, the receive end generates a congestion notification packet, and sends the congestion notification packet to the transmit end. After receiving the congestion notification packet, the transmit end reduces a transmission rate of subsequent data packets, to avoid network congestion. When the communications network uses a Transmission Control Protocol (TCP), a value of an ECN field in a TCP header of an acknowledgement (ACK) packet may be set to 1, and the ACK packet is used as the congestion notification packet. When the communications network uses a Remote Direct Memory Access over Converged Ethernet (RoCE) protocol, the receive end may send a congestion notification packet (CNP) to the transmit end.

Based on the process of communication between the transmit end and the receive end in the communications network, it can be learned that a key to performing effective congestion control based on the ECN mechanism in the communications network lies in determining the ECN threshold for the egress queue. When an excessively high ECN threshold is set, the queue depth of the egress queue in the network device is comparatively large, resulting in a longer data packet transmission delay. When an excessively low ECN threshold is set, the transmit end sends a data packet at a lower rate, resulting in lower network resource utilization. According to the congestion control method provided in an embodiment of this application, the network device dynamically adjusts the ECN threshold for the egress queue, thereby improving flexibility in network congestion control.

Figure 3:
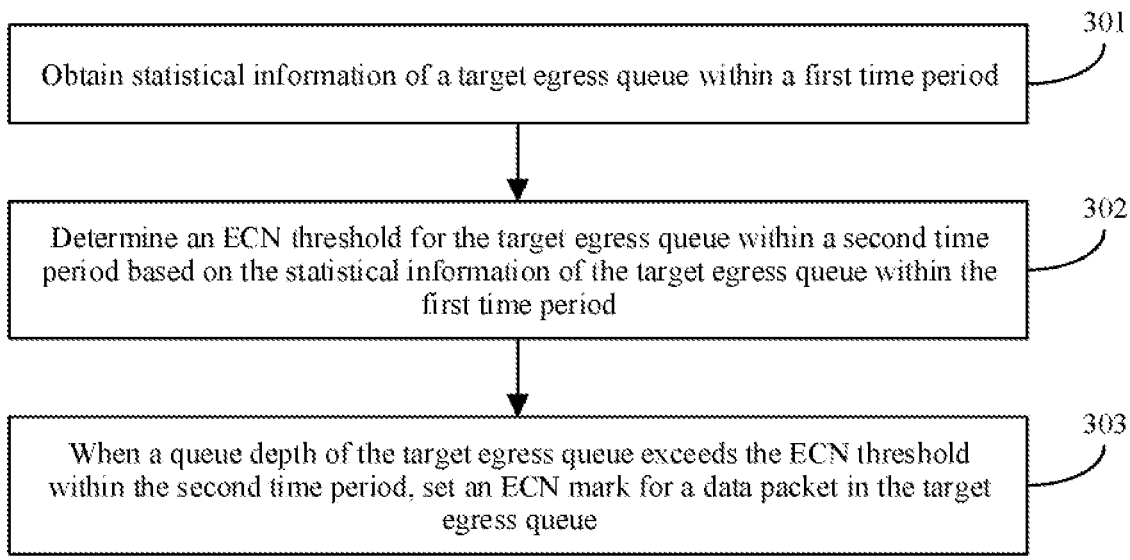
FIG. 3 is a flowchart of a congestion control method according to an embodiment of this application.

FIG. 3 is a flowchart of a congestion control method according to an embodiment of this application. The method may be applied to any network device 102 in the communications network shown in FIG. 1. As shown in FIG. 3, the method includes the following steps.

Step 301: Obtain statistical information of a target egress queue within a first time period.

Optionally, the target egress queue is any egress queue in a network device. The network device may periodically obtain statistical information of the target egress queue. For example, the network device may obtain the statistical information of the target egress queue once every few microseconds. The first time period may be a past period.

Optionally, the statistical information includes one or more of a packet transmission rate, queue depth change information, or priority flow control (PFC) back pressure information. The queue depth change information is used to reflect a change in a queue depth of the target egress queue within the first time period, and the change in a queue depth is a change in occupied memory of an egress queue. If the queue depth of the egress queue decreases, it indicates that the occupied memory of the egress queue decreases, that is, available memory of the egress queue increases. Optionally, the queue depth change information includes a queue depth of the target egress queue at a start moment of the first time period and a queue depth of the target egress queue at an end moment of the first time period. Alternatively, the queue depth change information includes a difference between a queue depth of the target egress queue at a start moment of the first time period and a queue depth of the target egress queue at an end moment of the first time period. The PFC back pressure information is used to reflect whether the target egress queue receives a PFC frame within the first time period. Optionally, the PFC back pressure information includes a quantity of PFC frames received by the target egress queue within the first time period.

Figure 4:
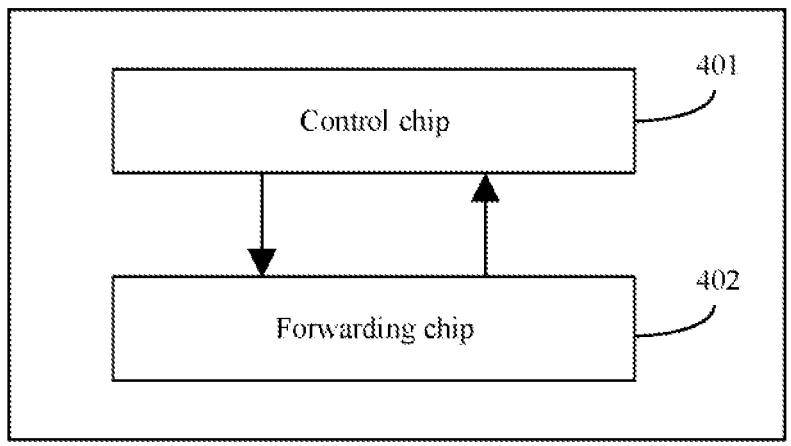
FIG. 4 is a schematic structural diagram of a network device according to an embodiment of this application.

Optionally, FIG. 4 is a schematic structural diagram of a network device according to an embodiment of this application. As shown in FIG. 4, the network device includes a control chip 401 and a forwarding chip 402. An egress queue is located on the forwarding chip 402. The control chip 401 and the forwarding chip 402 are connected and communicate through a physical connection. The control chip may be a field programmable gate array (FPGA) chip or a central processing unit (CPU). That the network device obtains statistical information of a target egress queue within a first time period includes: The control chip in the network device reads the statistical information of the target egress queue within the first time period from the forwarding chip on which the target egress queue is located. Optionally, the control chip and the forwarding chip in the network device may alternatively be integrated, that is, a control function and a forwarding function are integrated on one chip. In an embodiment of this application, an example in which the network device includes a control chip and a forwarding chip is used for description.

For example, when the statistical information includes the packet transmission rate, the control chip may read a quantity of queue outgoing bytes of the target egress queue within the first time period from the forwarding chip, and calculate a packet transmission rate of the target egress queue within the first time period based on the quantity of queue outgoing bytes and a length of the first time period (the packet transmission rate within the first time period is equal to the quantity of queue outgoing bytes within the first time period divided by the length of the first time period); or the control chip may alternatively directly read a packet transmission rate of the target egress queue within the first time period from the forwarding chip.

Step 302: Determine an ECN threshold for the target egress queue within a second time period based on the statistical information of the target egress queue within the first time period.

The second time period is chronologically subsequent to the first time period. The first time period and the second time period may be adjacent time periods, that is, the end moment of the first time period is equal to a start moment of the second time period. Alternatively, the first time period may not be adjacent to the second time period, that is, the end moment of the first time period is chronologically prior to a start moment of the second time period. The length of the first time period and a length of the second time period may be the same, or may be different. For example, when the network device periodically obtains the statistical information of the target egress queue, the first time period and the second time period may be two adjacent periods. That the network device determines an ECN threshold for the target egress queue within a second time period based on the statistical information of the target egress queue within the first time period includes: The control chip in the network device determines the ECN threshold for the target egress queue within the second time period based on the statistical information of the target egress queue within the first time period.

In a first optional embodiment of this application, the statistical information of the target egress queue within the first time period includes the packet transmission rate of the target egress queue within the first time period. In this case, an implementation process of step 202 includes: Determine the ECN threshold based on the packet transmission rate and a target delay, where the target delay is positively correlated with a maximum round trip time (RTT) on some or all transmission links on which the network device is located.

Optionally, a product of the packet transmission rate and the target delay may be calculated, and the ECN threshold is determined based on the product of the packet transmission rate and the target delay. The target delay may be equal to the maximum round trip time of the round trip times on all the transmission links on which the network device is located. For example, it is assumed that the network device is the network device 102b in the communications network shown in FIG. 1, the network device 102b is located on a first transmission link between the transmit end 101a and the receive end 103, and the network device 102b is located on a second transmission link between the transmit end 101b and the receive end 103. It is assumed that a round trip time on the first transmission link is an RTT1, and a round trip time on the second transmission link is an RTT2. In this case, a larger one of the RTT1 and the RTT2 may be used as the target delay. In an embodiment of this application, the target delay may be alternatively configured by a user. This is not limited.

The ECN threshold for the target egress queue within the second time period is determined based on the packet transmission rate of the target egress queue within the first time period. A higher packet transmission rate of the target egress queue within the first time period enables a larger ECN threshold for the target egress queue within the second time period. For example, the product of the packet transmission rate and the target delay is used as the ECN threshold, so that the ECN threshold for the target egress queue is positively correlated with the packet transmission rate. This can ensure a high throughput for the communications network while ensuring a low transmission delay of a data packet, thereby improving network resource utilization.

In a second optional embodiment of this application, the statistical information of the target egress queue within the first time period includes queue depth change information of the target egress queue within the first time period. In this case, an implementation process of step 202 includes: When the queue depth of the target egress queue at the end moment of the first time period is less than the queue depth of the target egress queue at the start moment of the first time period, determine a maximum ECN threshold supported by the forwarding chip on which the target egress queue is located as the ECN threshold for the target egress queue within the second time period, or cancel setting of the ECN threshold for the target egress queue within the second time period.

When the queue depth of the target egress queue at the end moment of the first time period is less than the queue depth of the target egress queue at the start moment of the first time period, it indicates that the packet transmission rate of the target egress queue within the first time period is greater than a packet reception rate of the target egress queue within the first time period. That is, it reflects that a packet transmission rate of the transmit end does not reach a maximum throughput of the network device. Therefore, a rate at which the transmit end sends a data packet does not need to be reduced. In this case, the maximum ECN threshold supported by the forwarding chip on which the target egress queue is located may be used as the ECN threshold for the target egress queue, or the setting of the ECN threshold for the target egress queue may be cancelled, to improve network resource utilization.

In a third optional embodiment of this application, the statistical information of the target egress queue within the first time period includes PFC back pressure information of the target egress queue within the first time period. In this case, an implementation process of step 202 includes: When the target egress queue receives a PFC frame within the first time period, or the packet transmission rate of the target egress queue within the first time period is 0, determine a maximum ECN threshold supported by the forwarding chip on which the target egress queue is located as the ECN threshold for the target egress queue within the second time period, or cancel setting of the ECN threshold for the target egress queue within the second time period.

A PFC mechanism is a queue-based back pressure mechanism. When congestion occurs in a network device, the network device sends a PFC frame, which may also be referred to as a pause frame, to instruct an upstream device to suspend packet sending, thereby preventing a packet loss due to queue buffer overflow in the network device. For example, it is assumed that the network device in which the target egress queue is located is the network device 102a in the communications network shown in FIG. 1, and the network device 102a is an upstream device of the network device 102b. When congestion occurs in an egress queue that is in the network device 102b and that is corresponding to the target egress queue in the network device 102a, a PFC frame is sent to the target egress queue in the network device 102a. After receiving the PFC frame, the target egress queue in the network device 102a suspends sending of a data packet to the network device 102b. When the first time period is within an effective period of a previous PFC frame, the packet transmission rate of the target egress queue within the first time period is 0. After congestion occurs in the network device 102b, the network device 102b sets an ECN mark for a data packet that is in the egress queue of the network device 102b and that exceeds an ECN threshold, to instruct the transmit end to reduce a transmission rate of subsequent data packets. However, congestion that occurs in the target egress queue in the network device 102a is caused by the PFC frame sent by the network device 102b. Therefore, an ECN mark does not need to be set for a data packet in the target egress queue. The maximum ECN threshold supported by the forwarding chip that is in the network device 102a and on which the target egress queue is located may be used as the ECN threshold for the target egress queue, or the setting of the ECN threshold for the target egress queue may be cancelled. In this way, the following problem is avoided: The receive end sends a congestion notification packet to the transmit end for a plurality of times, which causes the transmit end to excessively reduce the transmission rate of subsequent data packets, thereby affecting a throughput of the communications network.

Optionally, in a first possible implementation of the first optional embodiment, the statistical information of the target egress queue within the first time period further includes queue depth change information of the target egress queue within the first time period. In this case, the determining the ECN threshold based on the packet transmission rate and a target delay includes: When the queue depth of the target egress queue at the end moment of the first time period is greater than or equal to the queue depth of the target egress queue at the start moment of the first time period, determine the ECN threshold based on the packet transmission rate and the target delay.

When the queue depth of the target egress queue at the end moment of the first time period is less than the queue depth of the target egress queue at the start moment of the first time period, refer to the solution described in the foregoing second optional embodiment. Details are not described herein in an embodiment of this application.

Optionally, in a second possible implementation of the first optional embodiment, the statistical information of the target egress queue within the first time period further includes PFC back pressure information of the target egress queue within the first time period. In this case, the determining the ECN threshold based on the packet transmission rate and a target delay includes: When the target egress queue does not receive a PFC frame within the first time period, and the packet transmission rate of the target egress queue within the first time period is not 0, determine the ECN threshold based on the packet transmission rate and the target delay.

When the target egress queue receives a PFC frame within the first time period, or the packet transmission rate of the target egress queue within the first time period is 0, refer to the solution described in the foregoing third optional embodiment. Details are not described herein in an embodiment of this application.

Optionally, in a third possible implementation of the first optional embodiment, the statistical information of the target egress queue within the first time period further includes queue depth change information of the target egress queue within the first time period and PFC back pressure information of the target egress queue within the first time period. In this case, the process of the determining the ECN threshold based on the packet transmission rate and a target delay includes the following.

1. Determine a first ECN threshold based on the packet transmission rate and the target delay.
2. Determine a second ECN threshold based on the queue depth change information.

Optionally, when the queue depth of the target egress queue at the end moment of the first time period is less than the queue depth of the target egress queue at the start moment of the first time period, the maximum ECN threshold supported by the forwarding chip on which the target egress queue is located is determined as the second ECN threshold. When the queue depth of the target egress queue at the end moment of the first time period is greater than or equal to the queue depth of the target egress queue at the start moment of the first time period, the first ECN threshold is used as the second ECN threshold.

3. Determine a third ECN threshold based on the PFC back pressure information.

Optionally, when the target egress queue receives a PFC frame within the first time period, or the packet transmission rate of the target egress queue within the first time period is 0, the maximum ECN threshold supported by the forwarding chip on which the target egress queue is located is determined as the third ECN threshold. When the target egress queue does not receive a PFC frame within the first time period, and the packet transmission rate of the target egress queue within the first time period is not 0, the first ECN threshold is used as the third ECN threshold.

4. Determine a maximum ECN threshold of the first ECN threshold, the second ECN threshold, and the third ECN threshold as the ECN threshold.

The ECN threshold is obtained based on the packet transmission rate and the target delay, or the ECN threshold is the maximum ECN threshold supported by the forwarding chip on which the target egress queue is located.

Step 303: When the queue depth of the target egress queue exceeds the ECN threshold within the second time period, set an ECN mark for a data packet in the target egress queue.

Optionally, after determining the ECN threshold for the target egress queue within the second time period, the control chip in the network device configures the ECN threshold in the target egress queue that is on the forwarding chip. After receiving a data packet within the second time period, the network device detects whether a queue depth of the target egress queue exceeds the ECN threshold. When the queue depth of the target egress queue exceeds the ECN threshold, the network device sets an ECN mark for the received data packet, and buffers the data packet which includes the ECN mark in the target egress queue. Alternatively, when the network device intends to send, within the second time period, a data packet that is in the target egress queue, the network device detects whether a queue depth of the target egress queue exceeds the ECN threshold. When the queue depth of the target egress queue exceeds the ECN threshold, the network device sets an ECN mark for the to-be-sent data packet.

A sequence of performing the steps in the congestion control method provided in an embodiment of this application may be adjusted appropriately, or steps may be correspondingly increased or decreased as required. Any variation method readily figured out by a person skilled in the art within the technical scope disclosed in this application shall fall within the protection scope of this application. Therefore, details are not described herein.

According to the congestion control method provided in an embodiment of this application, the network device may determine an ECN threshold for an egress queue within a current time period based on statistical information of the egress queue within a past time period, thereby implementing dynamic adjustment of the ECN threshold for the egress queue. In this way, the network device can achieve both a low transmission delay and a high throughput in various communications networks or a communications network that changes in real time, thereby improving flexibility in network congestion control.

Figure 5:
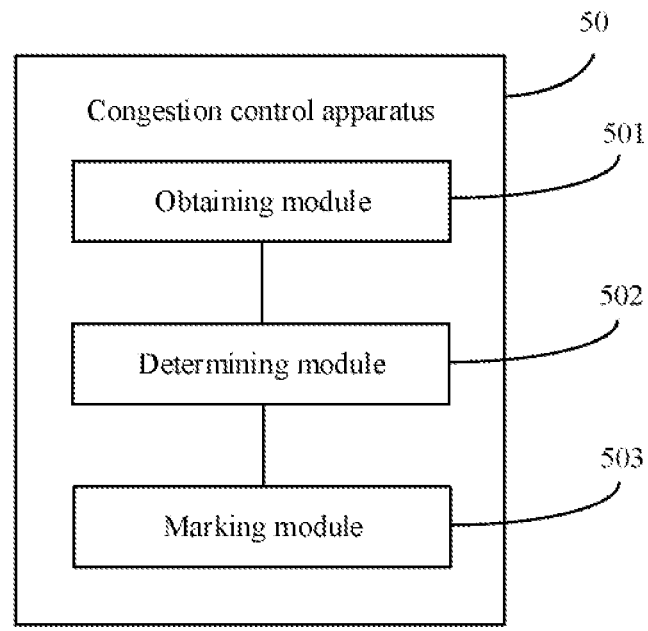
FIG. 5 is a schematic structural diagram of a congestion control apparatus according to an embodiment of this application.

FIG. 5 is a schematic structural diagram of a congestion control apparatus according to an embodiment of this application. The apparatus may be applied to any network device 102 in the communications network shown in FIG. 1. As shown in FIG. 5, the apparatus 50 includes:

an obtaining module 501, configured to obtain statistical information of a target egress queue within a first time period, where the target egress queue is any egress queue in a network device;

a determining module 502, configured to determine an explicit congestion notification ECN threshold for the target egress queue within a second time period based on the statistical information of the target egress queue within the first time period; and a marking module 503, configured to: set an ECN mark for a data packet in the target egress queue, when a queue depth of the target egress queue exceeds the ECN threshold within the second time period.

In the congestion control apparatus provided in an embodiment of this application, the network device may determine, by using the determining module, an ECN threshold for an egress queue within a current time period based on statistical information of the egress queue within a past time period, thereby implementing dynamic adjustment of the ECN threshold for the egress queue. In this way, the network device can achieve both a low transmission delay and a high throughput in various communications networks or a communications network that changes in real time, thereby improving flexibility in network congestion control.

Optionally, the determining module is configured to: determine the ECN threshold based on a packet transmission rate and a target delay, where the target delay is positively correlated with a maximum round trip time on transmission links on which the network device is located. In one embodiment, the target delay is positively correlated with a maximum round trip time on all transmission links on which the network device is located.

Optionally, the statistical information further includes queue depth change information, and the determining module is further configured to: when a queue depth of the target egress queue at an end moment of the first time period is greater than or equal to a queue depth of the target egress queue at a start moment of the first time period, determine the ECN threshold based on the packet transmission rate and the target delay.

Optionally, the statistical information further includes priority flow control PFC back pressure information, and the determining module is further configured to: when the target egress queue does not receive a PFC frame within the first time period, and a packet transmission rate of the target egress queue within the first time period is not 0, determine the ECN threshold based on the packet transmission rate and the target delay.

Optionally, the statistical information further includes queue depth change information and priority flow control PFC back pressure information, and the determining module is further configured to:

determine a first ECN threshold based on the packet transmission rate and the target delay; determine a second ECN threshold based on the queue depth change information; determine a third ECN threshold based on the PFC back pressure information; and determine a maximum ECN threshold of the first ECN threshold, the second ECN threshold, and the third ECN threshold as the ECN threshold, where the ECN threshold is obtained based on the packet transmission rate and the target delay, or the ECN threshold is a maximum ECN threshold supported by a forwarding chip on which the target egress queue is located.

Optionally, the statistical information includes queue depth change information, and the determining module is configured to:

when a queue depth of the target egress queue at an end moment of the first time period is less than a queue depth of the target egress queue at a start moment of the first time period, determine a maximum ECN threshold supported by a forwarding chip on which the target egress queue is located as the ECN threshold for the target egress queue within the second time period, or cancel setting of the ECN threshold for the target egress queue within the second time period.

Optionally, the statistical information includes priority flow control PFC back pressure information, and the determining module is configured to:

when the target egress queue receives a PFC frame within the first time period, or a packet transmission rate of the target egress queue within the first time period is 0, determine a maximum ECN threshold supported by a forwarding chip on which the target egress queue is located as the ECN threshold for the target egress queue within the second time period, or cancel setting of the ECN threshold for the target egress queue within the second time period.

In the congestion control apparatus provided in an embodiment of this application, the network device may determine, by using the determining module, an ECN threshold for an egress queue within a current time period based on statistical information of the egress queue within a past time period, thereby implementing dynamic adjustment of the ECN threshold for the egress queue. In this way, the network device can achieve both a low transmission delay and a high throughput in various different communications networks or a communications network that changes in real time, thereby improving flexibility in network congestion control.

For the apparatus in the foregoing embodiment, a specific manner of executing an operation by each module is described in detail in a related method embodiment, and details are not described herein.

Figure 6:
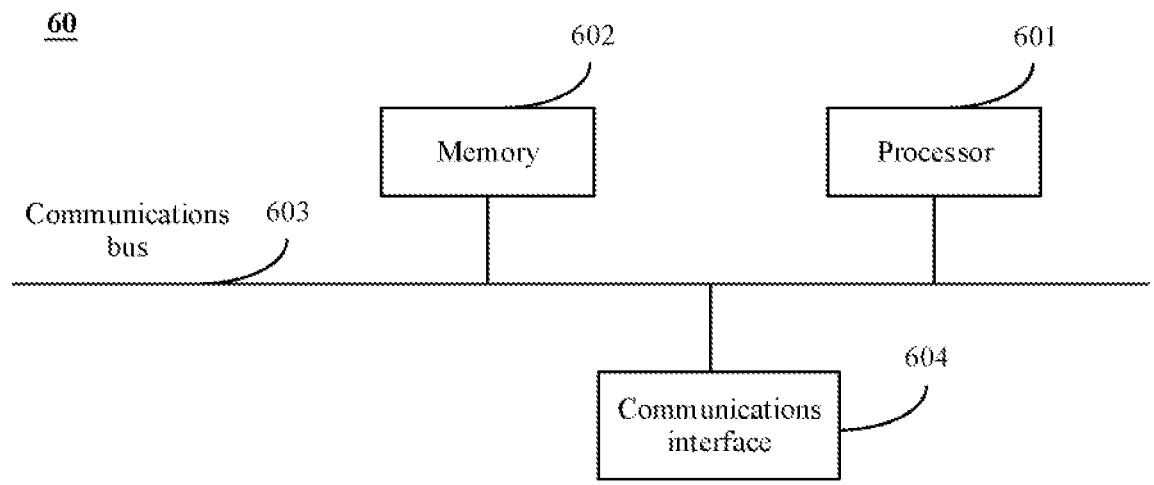
FIG. 6 is a block diagram of a network device according to an embodiment of this application.

FIG. 6 is a block diagram of a network device according to an embodiment of this application. As shown in FIG. 6, the network device 60 includes a processor 601 and a memory 602.

The memory 602 is configured to store a computer program, where the computer program includes program instructions.

The processor 601 is configured to invoke the computer program to implement the congestion control method shown in FIG. 3.

Optionally, the network device 60 further includes a communications bus 603 and a communications interface 604.

The processor 601 includes one or more processing cores, and the processor 601 executes various functional applications and performs data processing by running the computer program.

The memory 602 may be configured to store the computer program. Optionally, the memory may store an operating system and an application program unit that is required by at least one function. The operating system may be an operating system such as a real time executive (RTX) system, LINUX, UNIX, WINDOWS, or OS X.

There may be a plurality of communications interfaces 604, and the communications interface 604 is configured to communicate with another storage device or another network device. For example, in an embodiment of this application, the communications interface 604 may be configured to receive an alarm log sent by a network device in a communications network.

The memory 602 and the communications interface 604 are separately connected to the processor 601 by using the communications bus 603.

An embodiment of this application further provides a computer storage medium. The computer storage medium stores instructions. When the instructions are executed by a processor, the congestion control method shown in FIG. 3 is implemented.

A person of ordinary skill in the art may understand that all or some of the steps in the embodiments may be implemented by hardware or a program instructing related hardware. The program may be stored in a computer-readable storage medium. The storage medium may be a read-only memory, a magnetic disk, an optical disc, or the like.

In the embodiments of this application, the terms "first", "second", and "third" are merely used for description purposes, but cannot be understood as an indication or implication of relative importance. The term "at least one" means one or more, and the term "a plurality" means two or more, unless expressly limited otherwise.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A congestion control method, comprising:
obtaining statistical information of a target egress queue within a first time period, wherein the target egress queue is an egress queue in a network device;
determining, based on the statistical information of the target egress queue within the first time period, an explicit congestion notification (ECN) threshold for the target egress queue within a second time period; and
setting an ECN mark for a data packet in the target egress queue when a queue depth of the target egress queue exceeds the ECN threshold within the second time period;
wherein the statistical information further comprises queue depth change information, and the determining, based on the statistical information of the target egress queue within the first time period, an explicit congestion notification (ECN) threshold for the target egress queue within a second time period comprises:
when a queue depth of the target egress queue at an end moment of the first time period is less than a queue depth of the target egress queue at a start moment of the first time period, determining a maximum ECN threshold supported by a forwarding chip on which the target egress queue is located as the ECN threshold for the target egress queue within the second time period, or canceling setting of the ECN threshold for the target egress queue within the second time period.

2. The method as claimed in claim 1, wherein the statistical information comprises a packet transmission rate, and the determining, based on the statistical information of the target egress queue within the first time period, an explicit congestion notification (ECN) threshold for the target egress queue within a second time period comprises:
determining the ECN threshold based on the packet transmission rate and a target delay, wherein the target delay is positively correlated with a maximum round trip time on transmission links on which the network device is located.

3. The method as claimed in claim 2, wherein the statistical information further comprises queue depth change information, and the determining the ECN threshold based on the packet transmission rate and a target delay comprises:
when a queue depth of the target egress queue at an end moment of the first time period is greater than or equal to a queue depth of the target egress queue at a start moment of the first time period, determining the ECN threshold based on the packet transmission rate and the target delay.

4. The method as claimed in claim 2, wherein the statistical information further comprises priority flow control (PFC) back pressure information, and the determining the ECN threshold based on the packet transmission rate and a target delay comprises:
when the target egress queue does not receive a PFC frame within the first time period, and a packet transmission rate of the target egress queue within the first time period is not 0, determining the ECN threshold based on the packet transmission rate and the target delay.

5. The method as claimed in claim 2, wherein the statistical information further comprises queue depth change information and priority flow control (PFC) back pressure information, and the determining the ECN threshold based on the packet transmission rate and a target delay comprises:
- determining a first ECN threshold based on the packet transmission rate and the target delay;
- determining a second ECN threshold based on the queue depth change information;
- determining a third ECN threshold based on the PFC back pressure information; and
- determining a maximum ECN threshold of the first ECN threshold, the second ECN threshold, and the third ECN threshold as the ECN threshold, wherein the ECN threshold is determined based on the packet transmission rate and the target delay, or the ECN threshold is a maximum ECN threshold supported by a forwarding chip on which the target egress queue is located.

6. The method as claimed in claim 1, wherein the statistical information further comprises queue depth change information, and the determining, based on the statistical information of the target egress queue within the first time period, an explicit congestion notification (ECN) threshold for the target egress queue within a second time period comprises:
- when the target egress queue receives a PFC frame within the first time period, or a packet transmission rate of the target egress queue within the first time period is 0, determining a maximum ECN threshold supported by a forwarding chip on which the target egress queue is located as the ECN threshold for the target egress queue within the second time period, or canceling setting of the ECN threshold for the target egress queue within the second time period.

7. A network device comprising a processor and a memory, wherein
- the memory is configured to store a computer program, wherein the computer program comprises program instructions;
- the processor is configured to invoke the computer program to implement a congestion control method, wherein the congestion control method comprises:
  - obtaining statistical information of a target egress queue within a first time period, wherein the target egress queue is an egress queue in a network device;
  - determining, based on the statistical information of the target egress queue within the first time period, an explicit congestion notification (ECN) threshold for the target egress queue within a second time period; and
  - setting an ECN mark for a data packet in the target egress queue, when a queue depth of the target egress queue exceeds the ECN threshold within the second time period;
- wherein the statistical information further comprises queue depth change information, and the determining, based on the statistical information of the target egress queue within the first time period, an explicit congestion notification (ECN) threshold for the target egress queue within a second time period comprises:
  - when a queue depth of the target egress queue at an end moment of the first time period is less than a queue depth of the target egress queue at a start moment of the first time period, determining a maximum ECN threshold supported by a forwarding chip on which the target egress queue is located as the ECN threshold for the target egress queue within the second time period, or canceling setting of the ECN threshold for the target egress queue within the second time period.

8. The network device as claimed in claim 7, wherein the statistical information comprises a packet transmission rate, and the determining, based on the statistical information of the target egress queue within the first time period, an explicit congestion notification (ECN) threshold for the target egress queue within a second time period comprises:
- determining the ECN threshold based on the packet transmission rate and a target delay, wherein the target delay is positively correlated with a maximum round trip time on transmission links on which the network device is located.

9. The network device as claimed in claim 8, wherein the statistical information further comprises queue depth change information, and the determining the ECN threshold based on the packet transmission rate and a target delay comprises:
- when a queue depth of the target egress queue at an end moment of the first time period is greater than or equal to a queue depth of the target egress queue at a start moment of the first time period, determining the ECN threshold based on the packet transmission rate and the target delay.

10. The network device as claimed in claim 8, wherein the statistical information comprises priority flow control (PFC) back pressure information, and the determining the ECN threshold based on the packet transmission rate and a target delay comprises:
- when the target egress queue does not receive a PFC frame within the first time period, and a packet transmission rate of the target egress queue within the first time period is not 0, determining the ECN threshold based on the packet transmission rate and the target delay.

11. The network device as claimed in claim 8, wherein the statistical information further comprises queue depth change information and priority flow control (PFC) back pressure information, and the determining the ECN threshold based on the packet transmission rate and a target delay comprises:
- determining a first ECN threshold based on the packet transmission rate and the target delay;
- determining a second ECN threshold based on the queue depth change information;
- determining a third ECN threshold based on the PFC back pressure information; and
- determining a maximum ECN threshold of the first ECN threshold, the second ECN threshold, and the third ECN threshold as the ECN threshold, wherein the ECN threshold is determined based on the packet transmission rate and the target delay, or the ECN threshold is a maximum ECN threshold supported by a forwarding chip on which the target egress queue is located.

12. The network device as claimed in claim 7, wherein the statistical information further comprises queue depth change information, and the determining, based on the statistical information of the target egress queue within the first time period, an explicit congestion notification (ECN) threshold for the target egress queue within a second time period comprises:
- when the target egress queue receives a PFC frame within the first time period, or a packet transmission rate of the target egress queue within the first time period is 0, determining a maximum ECN threshold supported by a forwarding chip on which the target egress queue is located as the ECN threshold for the target egress queue within the second time period, or canceling setting of the ECN threshold for the target egress queue within the second time period.

13. A communication network, comprising a transmit end, a receive end, and a network device, wherein the network device is configured to forward a packet from the transmit end to the receive end, and is further configured to:
  obtain statistical information of a target egress queue within a first time period, wherein the target egress queue is an egress queue in a network device;
  determine an explicit congestion notification (ECN) threshold for the target egress queue within a second time period based on the statistical information of the target egress queue within the first time period; and
  set an ECN mark for a data packet in the target egress queue when a queue depth of the target egress queue exceeds the ECN threshold within the second time period;
  wherein the statistical information comprises queue depth change information, and the network device is configured to:
  when a queue depth of the target egress queue at an end moment of the first time period is less than a queue depth of the target egress queue at a start moment of the first time period, determine a maximum ECN threshold supported by a forwarding chip on which the target egress queue is located as the ECN threshold for the target egress queue within the second time period, or cancel setting of the ECN threshold for the target egress queue within the second time period.

14. The communication network according to claim 13, wherein the statistical information comprises a packet transmission rate, and the network device is configured to:
  determine the ECN threshold based on the packet transmission rate and a target delay, wherein the target delay is positively correlated with a maximum round trip time on transmission links on which the network device is located.

15. The communication network according to claim 14, wherein the statistical information further comprises queue depth change information, and the network device is further configured to:
  when a queue depth of the target egress queue at an end moment of the first time period is greater than or equal to a queue depth of the target egress queue at a start moment of the first time period, determine the ECN threshold based on the packet transmission rate and the target delay.

16. The communication network according to claim 14, wherein the statistical information further comprises priority flow control (PFC) back pressure information, and the network device is further configured to:
  when the target egress queue does not receive a PFC frame within the first time period, and a packet transmission rate of the target egress queue within the first time period is not 0, determine the ECN threshold based on the packet transmission rate and the target delay.

17. The communication network according to claim 14, wherein the statistical information further comprises queue depth change information and priority flow control (PFC) back pressure information, and the network device is further configured to:
  determine a first ECN threshold based on the packet transmission rate and the target delay;
  determine a second ECN threshold based on the queue depth change information;
  determine a third ECN threshold based on the PFC back pressure information; and
  determine a maximum ECN threshold of the first ECN threshold, the second ECN threshold, and the third ECN threshold as the ECN threshold, wherein the ECN threshold is determined based on the packet transmission rate and the target delay, or the ECN threshold is a maximum ECN threshold supported by a forwarding chip on which the target egress queue is located.

* * * * *

UNITED STATES PATENT AND TRADEMARK OFFICE
CERTIFICATE OF CORRECTION

| | | |
|---|---|---|
| PATENT NO. | : 11,870,698 B2 | Page 1 of 1 |
| APPLICATION NO. | : 17/540575 | |
| DATED | : January 9, 2024 | |
| INVENTOR(S) | : Zhigang Ji et al. | |

It is certified that error appears in the above-identified patent and that said Letters Patent is hereby corrected as shown below:

On the Title Page

In item (74), in Column 2, in "Attorney, Agent, or Firm", Line 1, delete "Rimon PC." and insert
-- Rimon PC --.

Signed and Sealed this
Thirtieth Day of April, 2024

Katherine Kelly Vidal
*Director of the United States Patent and Trademark Office*